Aug. 4, 1942.  E. L. BAILEY  2,291,862

REMOVAL OF BONDED RUBBER

Filed April 24, 1942

INVENTOR
*Edgar L. Bailey.*
BY
*Harness, Dind, Pates & Harris.*
ATTORNEYS.

Patented Aug. 4, 1942

2,291,862

UNITED STATES PATENT OFFICE 2,291,862

REMOVAL OF BONDED RUBBER

Edgar L. Bailey, Birmingham, Mich., assignor to Chrysler Corporation, Highland Park, Mich., a corporation of Delaware Application April 24, 1942, Serial No. 440,403

3 Claims. (Cl. 219—13)

This invention relates to an improved process for separating rubber and rubber containing parts from metal parts of a bonded composite rubber and metal structure.

More particularly the invention pertains to the provision in a process of this kind of an improved operation for breaking the bond between rubber and metal parts of a composite rubber and metal structure.

One of the main objects of the invention is to provide a process of this kind by which both the rubber and metal parts of worn or defective bonded composite rubber and metal structure can be salvaged without significant loss or deterioration of the rubber and without substantially altering the metal part or otherwise rendering such parts unsuited for re-working and re-use.

Another object of the invention is the provision of a rubber to metal bond breaking operation of this kind which operates efficiently on bonds between rubber and metal parts that are embedded deeply within the rubber portions of the structure and which have been formed by cementing or direct vulcanization of the rubber to the metal.

A further object of the invention is to apply heat directly to the bond between an entirely or partially rubber enclosed metal body without initially subjecting the exterior of the rubber content of a structure to heat or causing heat to penetrate the body of the rubber portion thereof in order to reach the bond.

A still further object of the invention is to apply sufficient heat to the bond between the rubber and metal parts of a structure in a sufficiently short period of time to soften the material constituting the bonding film and to generate gaseous pressure at the bonding film tending to expand the rubber body from the metal part.

An additional object of the invention is to provide in a method of this character an inductive heating operation by which heat is effectively applied directly at the surface of metal part to which the rubber is bonded.

An illustrative embodiment of the invention is shown in the accompanying drawing, in which.

Figure 1:
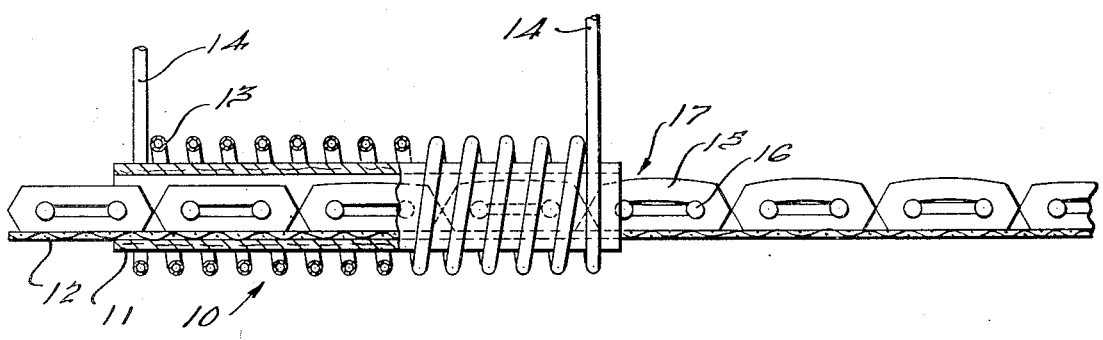
Fig. 1 is a fragmentary, partially sectional view of an inductive heating oven illustrating a rubber to metal bond breaking operation embodying the invention.

Heretofore it has been the practice to burn off the rubber of composite rubber and metal devices which have become worn or which, although new, have been rejected because of a defect. When this operation is resorted to, the rubber is completely destroyed and frequently the metal parts are so distorted and otherwise changed in their physical properties as to require excessive re-working.

In the practice of my improved process composite rubber and metal articles, such as tank tread links, for example, in which the ferrous metal parts are bonded to the rubber, are passed through an induction heating oven generally designated by the numeral 10. This oven includes casing 11 having opposite open ends and preferably comprising refractory material having substantially non-magnetic properties, through which is disposed a support 12, also comprising similar refractory, non-magnetic material. The casing 11 and support 12 may comprise stainless steel or "transite." A coil 13 surrounding the casing 11 is provided with terminals 14 which are connected with a source of alternating current not shown. The amperage, voltage and frequency of the current with which the coil 13 is supplied may be predetermined with respect to the nature and size of the work operated upon. An alternating current source of 460 volts, 100 amperes and 360 cycles has been found to be suitable for separating the rubber portions 15 from the metal parts 16 of pieces of work of the size of the tank tread links 17 illustrated in the drawing. The parts 16 comprise ferrous metal but composite rubber and metal structures comprising other magnetic metal may be operated upon similarly.

In the operation of the oven 10, successive articles, such as the tank tread links 17 are placed on the support 11 and progressively moved through the oven while the coil 13 is energized. The parts of the articles are thus inductively heated in the magnetic flux field of the coil 13 to a predetermined temperature depending upon the excitation of the coil 13, length of the oven 10 and rate of movement of the articles. During inductive heating of the metal parts the surfaces thereof are initially heated and since the bonds between the parts of the structure are located at these surfaces, heat is directly applied to the bonding strata of the structure without being transmitted through the rubber body.

The temperature at the bonding strata of the structure is preferably from 350° F. to 450° F., while the period for which this temperature is maintained varies in accordance with the temperature. The material comprising the bonding strata becomes softened under the heat to which it is subjected and the gas or vapor generated at the bonding strata serves to expand the rubber part away from the metal. In some instances separation occurs with an accompanying snapping sound characteristic of the releasing of rubber under tension but in any event, whether or not the rubber detached from the metal surface to which it was previously bonded by vulcanization or adhesions, it can be readily pulled apart from the metal.

Figure 2:
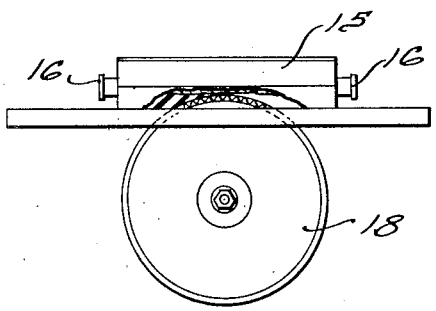
Fig. 2 is a side elevational view of a rubber cutting wheel illustrating the operation of severing the rubber element of a bonded rubber and metal assembly in which the metal is substantially embedded in the rubber element.
Figure 3:
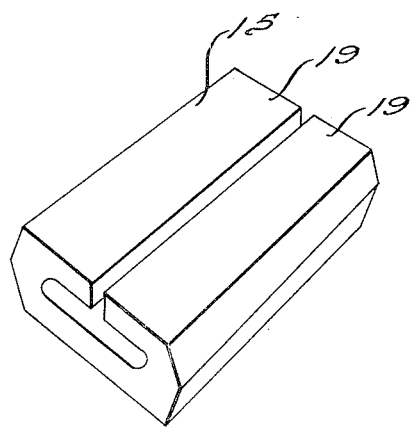
Fig. 3 is a perspective view showing the rubber member of a composite rubber and metal tank tread after separation from its metal part in accordance with the invention.

When, as in the case of a tank tread link and numerous other articles, the metal is substantially enveloped in the rubber, the latter may be severed, as illustrated in Fig. 2, by cutting it on a cutting wheel 18. The cut edge portions 19 of the rubber body 15 present a suitable purchase to facilitate pulling or peeling of the rubber from the metal. In most instances the rubber part 15 may be removed intact in the form illustrated in Fig. 3.

The rubber is thus removed without injuring or burning significant quantities thereof and may be re-used as reclaimed rubber. The surfaces of the metal parts may be cleaned in any suitable manner, such as by sand blasting, and used in another assembly.

Although but one specific embodiment of the invention is herein shown and described, it will be understood that various changes in the sequence of operations, steps and materials employed may be made without departing from the spirit of the invention.

I claim:

1. The method of removing a rubber body from an assembly having rubber and metal parts bonded together which comprises the steps of breaking the bond between the rubber and metal parts by inductively heating the metal part in a magnetic flux field of an induction coil until the bonding strata of said assembly is softened, and thereafter mechanically separating said parts.

2. The method of removing a rubber body from an assembly having rubber and metal parts bonded together which comprises the steps of breaking the bond between the rubber and metal parts by inductively heating the metal part in a magnetic flux field of an induction coil until the bonding strata of said assembly is softened and fluid pressure is created tending to expand said rubber part away from said metal part, and thereafter peeling said rubber part from said metal part.

3. The method of removing a rubber body from an assembly including a metal part substantially enveloped in a rubber part and having their contacting surfaces bonded together by vulcanization comprising the steps of breaking the bond between the rubber and metal parts by directly inductively heating the surface portions of the metal part adjacent said bond in a magnetic flux field until the bonding strata of said assembly is softened and fluid pressure is created between said rubber and metal parts, severing said rubber part to present edge portions, and thereafter mechanically separating said parts by peeling one of said edge portions and successively adjacent portions of said rubber part from said metal part.

EDGAR L. BAILEY.